(12) United States Patent
Wiley

(10) Patent No.: US 8,194,964 B2
(45) Date of Patent: Jun. 5, 2012

(54) ANALYSIS OF ANATOMIC REGIONS DELINEATED FROM IMAGE DATA

(75) Inventor: David Wiley, Woodland, CA (US)

(73) Assignee: Stratovan Corporation, Woodland, CA (US)

( * ) Notice: Subject to any disclaimer, the term of this patent is extended or adjusted under 35 U.S.C. 154(b) by 481 days.

(21) Appl. No.: 12/430,545

(22) Filed: Apr. 27, 2009

(65) Prior Publication Data

US 2009/0268956 A1    Oct. 29, 2009

Related U.S. Application Data

(60) Provisional application No. 61/047,982, filed on Apr. 25, 2008.

(51) Int. Cl.
*G06K 9/00*    (2006.01)
(52) U.S. Cl. ...................................................... 382/131
(58) Field of Classification Search ........... 382/128–132
See application file for complete search history.

(56) References Cited

U.S. PATENT DOCUMENTS

| | | | | |
|---|---|---|---|---|
| 8,041,619 | B1 * | 10/2011 | Liu et al. .......................... | 705/35 |
| 8,047,993 | B2 * | 11/2011 | Shau et al. ...................... | 600/453 |
| 8,064,673 | B2 * | 11/2011 | Kirchberg et al. ............. | 382/131 |
| 8,068,650 | B2 * | 11/2011 | Kumar et al. ................... | 382/128 |
| 8,073,226 | B2 * | 12/2011 | Farag et al. ..................... | 382/131 |
| 8,077,954 | B2 * | 12/2011 | Kale et al. ...................... | 382/131 |
| 2004/0070583 | A1 | 4/2004 | Tsai et al. | |
| 2007/0047794 | A1 | 3/2007 | Lang et al. | |
| 2008/0030497 | A1 | 2/2008 | Hu et al. | |

OTHER PUBLICATIONS

International Search Report issued Jul. 27, 2009 in corresponding PCT/US2009/41807.

* cited by examiner

*Primary Examiner* — Nathan Ha
(74) *Attorney, Agent, or Firm* — Mark J. Danielson; Pillsbury Winthrop Shaw Pittman LLP

(57) ABSTRACT

Systems and methods for delineating anatomical boundaries from two- and three-dimensional image data are described. A template shape is used to examine new image element (e.g. pixel and/or voxel) locations and determine boundary intersection based on characteristics determined from the plurality of image elements contained within this template. The result is a polyline/surface delineation of the desired anatomy, which can be used for morphometric/shape analysis, patient specific output, and knowledge-based queries.

21 Claims, 10 Drawing Sheets

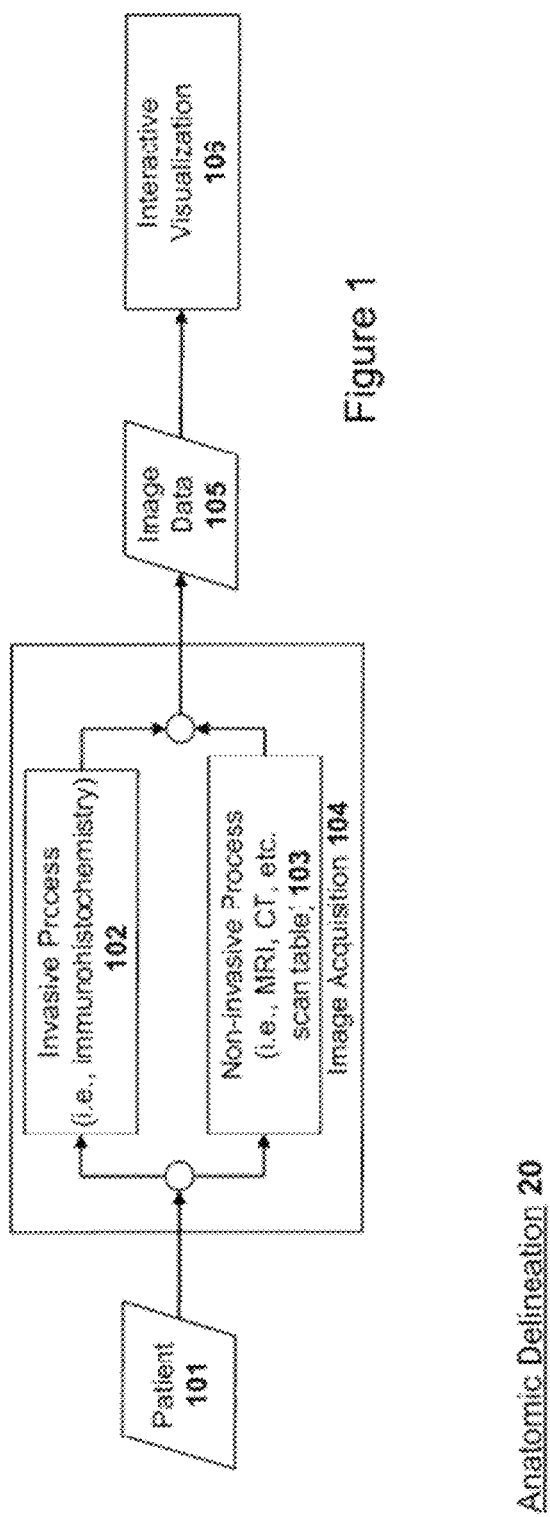
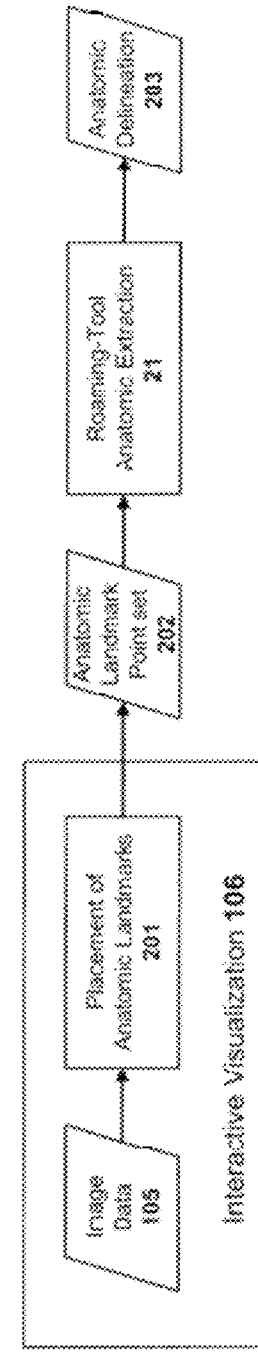
Figure 1
Figure 2A

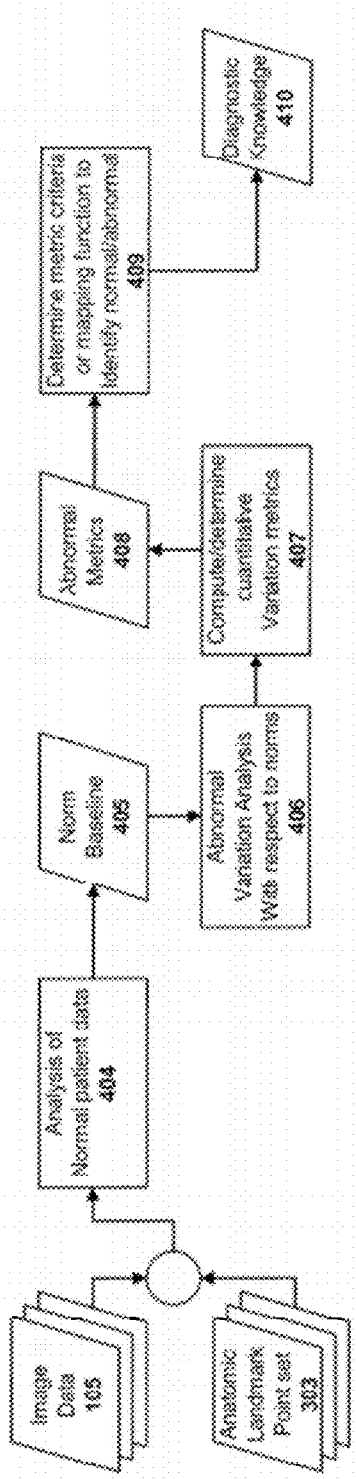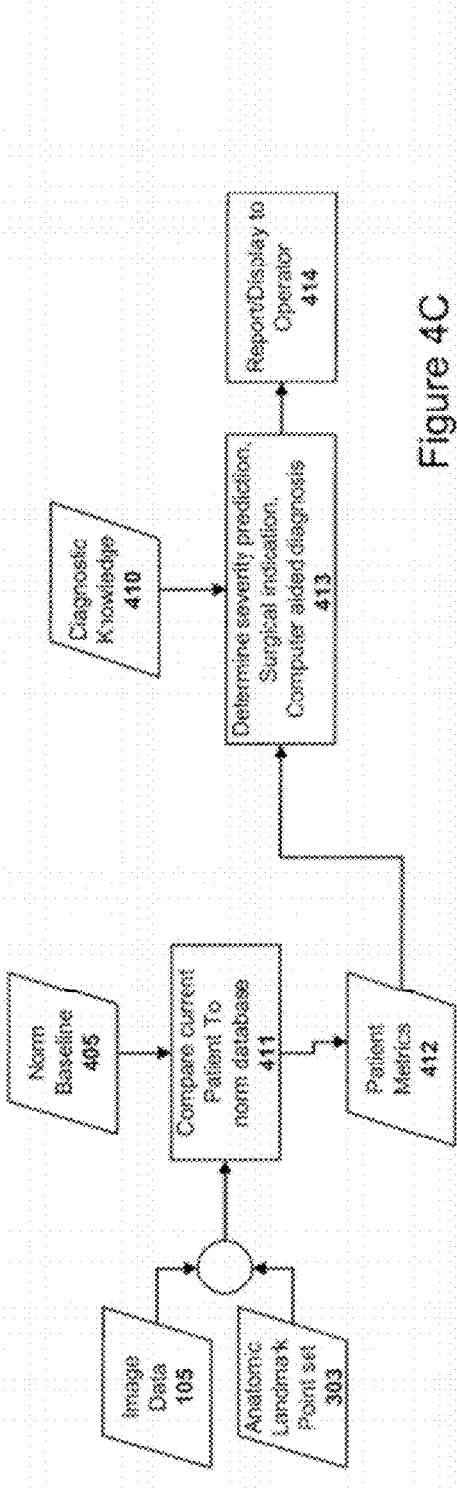
Figure 4B
Figure 4C

ANALYSIS OF ANATOMIC REGIONS DELINEATED FROM IMAGE DATA

CROSS-REFERENCE TO RELATED APPLICATIONS

The present application claims priority from U.S. Provisional Patent Application No. 61/047,982 filed Apr. 25, 2008, entitled "Orbit Morphology," which is incorporated by reference herein in its entirety.

BACKGROUND OF THE INVENTION

1. Field of the Invention

The present invention relates generally to imaging systems and more particularly to systems and methods for delineating anatomy from medical image data.

2. Description of Related Art

Medical treatment procedures based on medical image data often depend on morphological analyses of anatomic structures. Two-dimensional (2D) images from histology (immunohistochemistry) images and three-dimensional (3D) images from MRI, CT, PET, OCT, etc. imaging modalities provide computer accessible representations of a patient that can provide quantitative patient assessment. In the case of 3D MRI data, a radiologist examines the shape of a kidney, for example, as depicted in the image data to determine normality or the presence of a tumor. This depends upon the shape variation of the kidney observed in the patient image data using expert knowledge of how a normal kidney is shaped. Extrapolating that knowledge to how a particular patient's normal kidney should be shaped can aid in identifying anomalies indicating disease. Radiologists develop this expert knowledge throughout their career and often specialize in specific regions of the human body. Construction of a computer-based system replicating this knowledge and application thereof presents a complex set of tasks. The benefits of such a system would be substantial since that knowledge could be broadly applied in a more efficient manner. There is substantial research indicating that accurately obtained quantitative morphological measurements can be used for diagnosis, surgical indication, and/or severity quantification.

The main problem is obtaining an accurate anatomic representation to the extent that quantitative measurements can be taken reliably. This is generally referred to as image segmentation, which is the process of identifying the particular region encompassed by an anatomical part within image data. There are many applications of image segmentation, for example, textual characters can be identified on 2D images of typed documents [U.S. Pat. No. 6,298,151, U.S. Pat. No. 6,389,163, U.S. Pat. No. 6,157,736]; similar technology can be used to locate cells within immunohistochemistry images further allowing quantitative cellular analysis. In regard to 3D image segmentation, there are several methods that perform this task with varying success. These include threshold methods, atlas/template-based methods [U.S. Pat. No. 7,324,842, U.S. Pat. No. 5,926,568, 2006/0062425, 2007/0053589, 2007/0076932, 2007/0160277], active contour methods [U.S. Pat. No. 6,249,594], voxel-by-voxel region growing (flood fill) algorithms [U.S. Pat. No. 7,023,433, U.S. Pat. No. 5,185,809, U.S. Pat. No. 4,961,425, U.S. Pat. No. 5,319,551], pattern matching methods [2006/0056689], and machine vision methods [U.S. Pat. No. 7,346,209] to name a few. However, no general purpose segmentation method exists and most lack robustness across a variety of real-world patient data. The most common problem is the accurate delineation of the anatomic boundary which can be obscured by (i) poor image representation, (ii) disease, (iii) varying image intensity values throughout the anatomic part, (iv) similarities with other anatomical parts, and (v) touching anatomical parts. Furthermore, the boundary may simply be ill-defined such that general purpose image processing algorithms cannot accurately delineate anatomic boundaries.

BRIEF SUMMARY OF THE INVENTION

Certain embodiments of the present invention comprise systems and methods for delineating anatomy from medical image data. Source image data can be 2D images such as histology/immunohistochemistry images (color of grayscale) or 3D image data such as MRI, CT, PET, OCT, ultrasound, or from other image acquisition technologies that obtain a virtual representation of a patient. An anatomic region delineated from image data can provide valuable morphologic information. This shape information, usually in the form of landmark points or image pixel intensities, can provide the foundation for gathering statistical data establishing normal baselines. Furthermore, abnormal shape information can be compared to baselines to establish metrics for determining quantitative disease/injury severity, surgical indication, and possibly leading to computer aided diagnosis. Anatomic delineations can also be used to create patient-specific drill guides, surgical aids, and implants.

Certain embodiments of the invention provide methods guided by anatomical references that are either placed by an operator or are determined from some automated process. A template-tool shape can be used to "carve out" the anatomic region. This is achieved by placing the template tool inside the anatomic part—in the virtual space defined by the image data—and moving incrementally in all directions outward from the start location until it collides with boundaries of the anatomic region of interest.

Once the template tool has been moved to every possible location, the region covered by the roaming-tool process can be examined to facilitate extraction of the surface delineating the outline of the covered region. This surface then represents the anatomic boundary of the anatomic region of interest. Placement of anatomical landmark points on this surface, either in an automatic, semi-automatic, or manual process allows subsequent morphological analysis of the extracted anatomical shape. This shape information can be (i) used to create norm databases, (ii) compared to existing norm databases, (iii) statistically examined in order to determine disease severity, diagnosis, or surgical predictions, and/or (iv) used to create patient-specific drill guides, surgical aids, or implants.

BRIEF DESCRIPTION OF THE DRAWINGS

FIG. 1 illustrates an example of an acquisition and visualization process.

FIG. 2A depicts an example of an anatomic delineation process according to certain aspects of the invention.

FIG. 4B is a flowchart detailing certain aspects of norm database creation in certain embodiments of the invention.

FIG. 4C is a flowchart detailing certain aspects of norm database comparison in certain embodiments of the invention.

DETAILED DESCRIPTION OF THE INVENTION

Figure 2B:
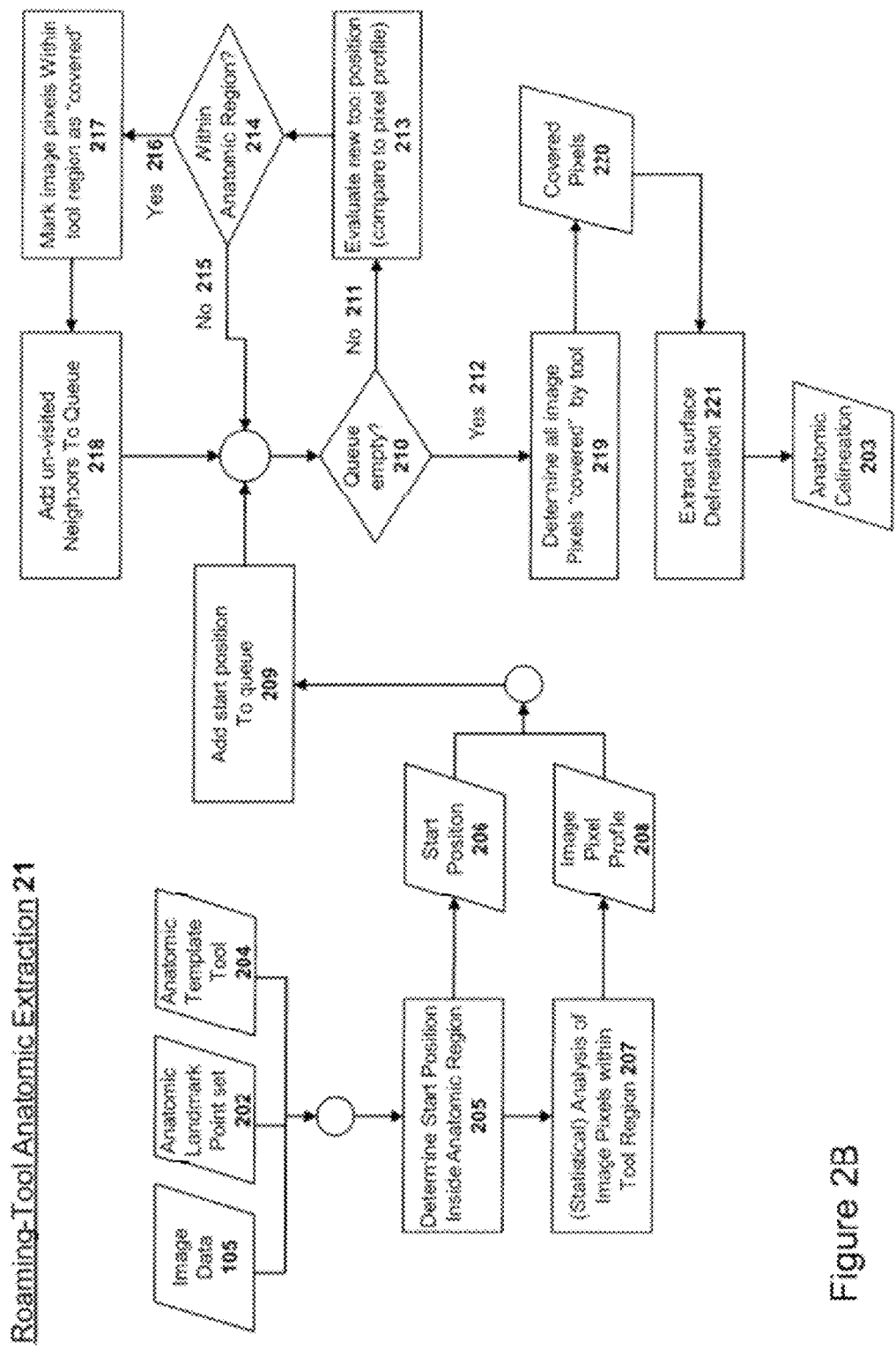
FIG. 2B depicts an example of roaming-tool anatomic extraction according to certain aspects of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein.

Moreover, applicant does not intend for any term in the specification or claims to be ascribed an uncommon or special meaning unless explicitly set forth as such. In that regard, as used herein the term "globe" refers to the eye ball, the term "orbit" and "bony orbit" refers to the shape or space bounded by the bone surrounding the globe, tissue, and muscle of an eye, the term "enopthalmos" refers to the depression of globe into one's skull and "exopthalmos: protrusion of globe out of one's skull. Various aspects of the invention will be described using a 2D example although the invention is not limited to 2D space but encompasses 3D embodiments as well. In this regard, the terms "pixel" and "voxel" refer to elements that represent values on a regular grid of 2D and 3D space, respectively and are used interchangeably throughout this description.

Further, the present invention encompasses present and future known equivalents to the components referred to herein by way of illustration.

Certain embodiments of the invention are employed in situations where a person sustains a blow to the face. For example, a car accident or sports related injury such as a baseball striking the eye can result in one or more fractures to various bone structures surrounding the eye ball and that normally hold the globe in place. Fractures can occur in the zygomatic or frontal regions, orbital floor, or the thin bones in the nasal region. These fractures disrupt the normal shape of the bony orbit and typically result in substantial increase in the volume of the orbit. This increase in volume can cause enopthalmos, a condition where the victim's globe sinks into their skull. Severe globe malposition of more than a 1 mm displacement of the globe (from normal) results in aesthetic abnormalities that are noticeable by others. In addition, this malposition can lead to diplopia, blurry vision, and discomfort or pain.

Exopthalmos (protrusion of the globe) can occur as well when a patient has Grave's disease and may also be indicative of a tumor in the orbit region. The tumor expands and pushes the globe outward from the orbit. In this case, the surround bone is intact and the increase of tissue (from the tumor) induces pressure forcing the globe out.

The primary goal in repairing these ailments is to restore the original shape and volume of the problematic orbit. Repairing fractures in this region is done by repositioning free-floating fragments, removing fragments, and inserting a prosthetic or implants. In the case of a tumor, a goal of the surgeon is to remove the tumor while maintaining the integrity of the globe and orbit.

Regardless of the ailment, there are a number of morphological measurements that can provide insight into the surgical planning process, quantitation of certain parameters and risk assessment for developing ailments. Primarily, these measurements pertain to the orbit volume and globe position.

Globe position is used in many cases as an indicator or risk assessment tool. The globe position is typically measured using a Hertel exopthalmometer. This device is positioned such that base plates press against the zygomatic orbit rim on each side of a patient's head. Then, the operator looks at each cornea from particular angle and compares the location to a ruler affixed on the device. This method is unreliable for several reasons:

i) the patient may have sustained a fracture to either of the zygomatic orbit rims such that the bone itself is not in its normal location;

ii) inter- and intra-operator variation in base-plate placement; and iii) operator variation in "reading" the results from the device.

Prosthetic implants that are used during a repair are typically constructed by a surgeon and conventionally include either cutting mesh material or molding a shape from a flexible clay-like material such as Porex. Thus, there exists variation in how surgeons construct implants as well as where it is placed and how it is attached.

Certain embodiments of the invention provide systems and methods that employ computer software to aid in surgical planning processes by obtaining accurate and reproducible morphological measurement obtained from patient image data. Methods and systems according to certain aspects of the invention are robust in the presence of noisy image data, poor anatomic definition, poor anatomic boundary definition and the systems and methods are tolerant of anatomical variations due to injury, disease, etc.

FIG. 1 shows a generalized example of an acquisition and visualization process 10 for acquiring and presenting patient image data 105 to an operator. The patient 101 can be scanned directly by a non-invasive imaging device 103 (such as MRI, CT, etc.) and/or by an invasive process 102 (such as immunohistochemistry). Images acquired at step 104 are used to produce the patient image data 105, which can be processed and displayed to the operator using visualization system 106. Visualization system, described in more detail below, typically comprises visualization software and can be configured and controlled by the operator in order to produce one or more renderings of the patient image data 105 for display. The visualization system 106 can manipulate the renderings and image data in order to provide interactive visual representations of the patient image data 105. Visualizations can typically be displayed in real-time such that patient image data 105 is continuously updating. Real-time display of visualized data allows an operator of an imaging device to reposition, recalibrate and reconfigure the imaging device so that more complete image data is collected. For example, an operator may notice that an obstruction, lack of detail and/or an artifact or area of an image and can cause the imaging device to obtain more detailed image data.

FIGS. 2A and 2B show an example of certain processes 20 employed in systems for extracting anatomic delineations from the image data 105. Visualization system 106 can be used to manually and/or automatically specify landmark point(s) 201 resulting in a landmark point set 202 for use in guiding future processes. This point set 202 can be used to guide a roaming-tool anatomic delineation process 21 that produces a desired anatomic delineation 203. The resulting delineation 203 will normally be a polyline in 2D and a triangle mesh in 3D and may include the pixels/voxels encompassed by the delineating polyline/surface. Delineation process 21 may take as input image data 105, anatomic point set 202, and an anatomic template tool 204. If positioned within the image data 105 coordinate space, template tool 204 encompasses a region containing a plurality of image pixels. For example, the template tool 204 may include a spherical shape having a diameter that encompasses a plurality of image pixels in 3D space. Furthermore, the template tool 204 may represent any shape or grouping of pixels, even non-contiguous pixels and is typically smaller in size than the anticipated size of an anatomic region. A template tool 204 that is sufficiently smaller in size than the anticipated size of an anatomic region of interest permits template tool 204 to be positioned completely inside of the anatomic region without intersecting anatomic boundaries.

Additionally, template tool 204 is typically configured to be larger than any anticipated holes that may be found in the expected data. A start position 206 may be determined 205 based on a landmark point set 202 so that template tool 204 is entirely inside the anatomic region of interest when positioned at landmark point 206. Pixels circumscribed by template tool 204, when located at the start position 206, are examined at 207 to determine image pixel intensities within the template tool area. The image pixel density may be characterized using an intensity profile 208 or other criteria suitable for analyzing the image pixel intensities.

Start position 206 may be added to a queue 209 to initiate the roaming process. The queue is checked 210, if a template tool position is in the queue 211, the tool 204 is re-positioned at this new location and the pixels contained within template tool 204 are evaluated 213 and compared to the initial pixel profile 208. If the comparison 214 determines that template tool 204 has intersected an anatomic boundary 215 when located at the new position, further processing of that tool position is terminated and processing returns to step 210. If the comparison 214 determines that the new tool position constitutes an encompassed region that still lies within the anatomic region of interest 216, then all image pixels within template tool 204 are marked as "covered" 217 and all unvisited neighbor positions to the current tool position are added to the queue 218. Processing continues in this fashion until the queue is empty 212. Once empty 212, the "covered" image pixels 220 are identified 219 and used to guide further processes. In one example, the covered image pixels 220 are processed using a standard isosurface extraction process yielding a delineated anatomic surface 203.

Figure 3:
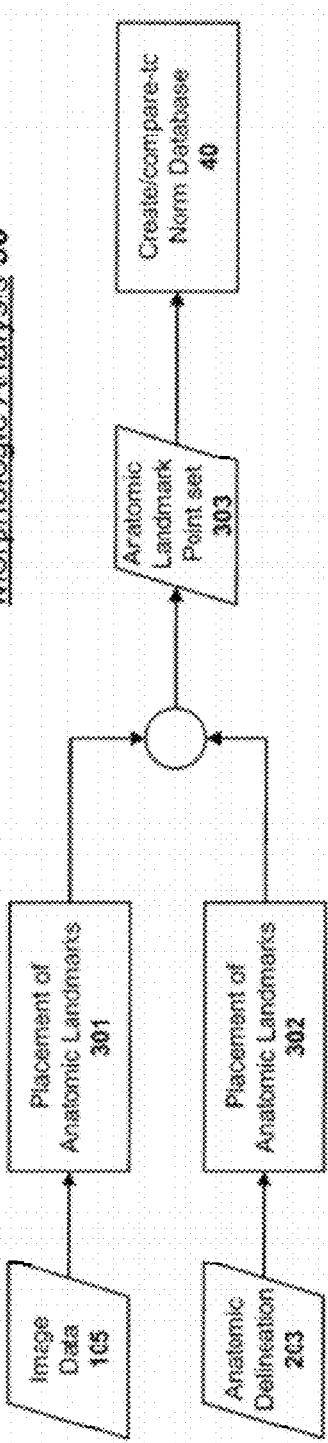
FIG. 3 is a flowchart showing morphologic analysis performed according to certain aspects of the invention.

Turning now to FIG. 3, a process for morphological analysis 30 of patient image data 105 is described. Landmark points are placed 301 directly on image data 105 and/or, placed 302 on the anatomic surface 203 delineated by process 20, thereby providing a point set 303 that is used to either produce a norm database or compared to one 40.

Figure 4A:
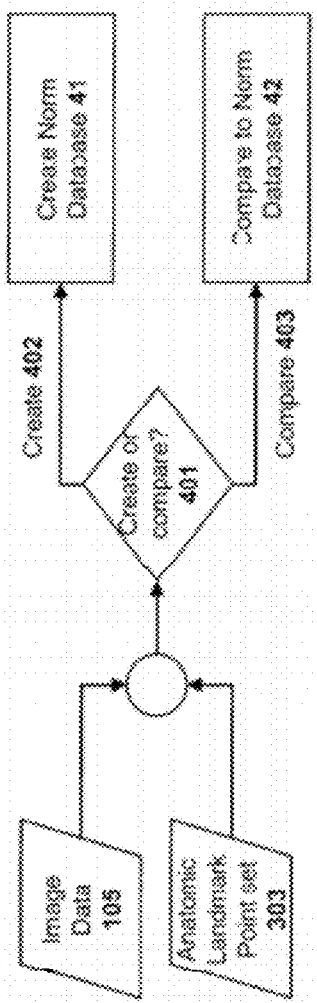
FIG. 4A shows an example of a process that creates or compares with a norm database.

FIGS. 4A, 4B and 4C illustrate a process 40 employed for patient diagnostics and based on normal and abnormal data. At step 401, the patient information 105 and 303 is evaluated and, in this example, a selection is made between a step of creating a norm database 41 or comparing the information to an existing norm database 42. Accordingly, if knowledge is being created (path 402), then process 41 is employed; however, if database knowledge is being queried 403, process 42 is employed. Diagnostic knowledge 410 is created using the process of step 41 from patient image data 105 and/or anatomic landmarks 303 obtained from a plurality of patients including both known normal and abnormal. Normal patient information is analyzed using the process of step 404 to establish norm baselines of 405. Patient information determined to be abnormal is compared 406 to the norm baselines of 405 in order to determine quantitative metrics 408 at 407 that can be used for variation analysis. Metrics 408 may be evaluated for plural abnormal cases to determine at 409 the quantitative criteria and/or mapping function that can be used to determine normality. Aggregation of metrics 408, variation analysis, statistical analysis, and other morphological analyses constitute the resulting diagnostic knowledge 410.

A patient having an unknown condition can be evaluated using diagnostic knowledge 410 using a process described by 42. Patient information, comprising image data 105 and/or landmark data 303, may be compared at 409 to one or more norm baselines 405 in order to obtain patient variation metrics 412 that can be evaluated in relation to diagnostic knowledge 410. This evaluation 413 may provide a surgical indication, diagnosis, and/or severity prediction, the results of which can be used to generate a printed report or otherwise displayed to the operator 414. Metrics for steps 408 or 412 may be derived from image data 105 intensity values and/or from the landmark point set 303 consisting of area, volume, one or more distances from anatomically relevant reference points, lines, and/or planes, the points themselves, integrated optical density, intensity statistics, intensity analysis, and may be statistical morphometric metrics that are, for example, typically used in anthropological research which are based on the points themselves.

Figure 5:
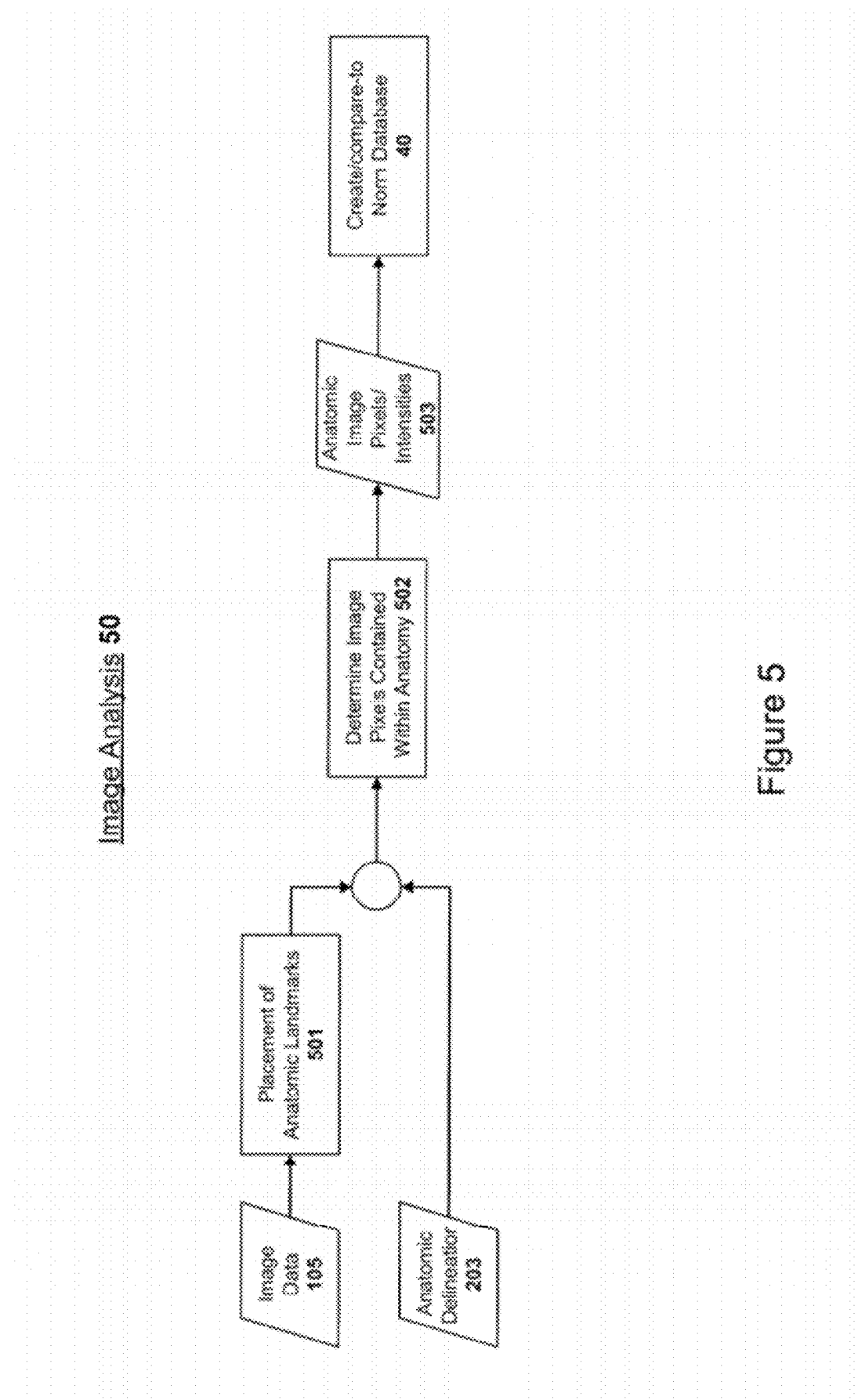
FIG. 5 is a flowchart describing a process for image analysis according to certain aspects of the invention.

FIG. 5 shows an example process for image analysis 50 of patient image data 105. Landmark points may be placed 501 directly on image data 105 to guide further processes. Image pixels of interest are determined at 502 from the anatomic delineation 203 and/or from landmark information 501 placed directly on the image data. A resulting set of image pixels and/or intensities 503 may be used for producing, creating, updating a norm database and/or for comparison with a norm database at 40.

Figure 6:
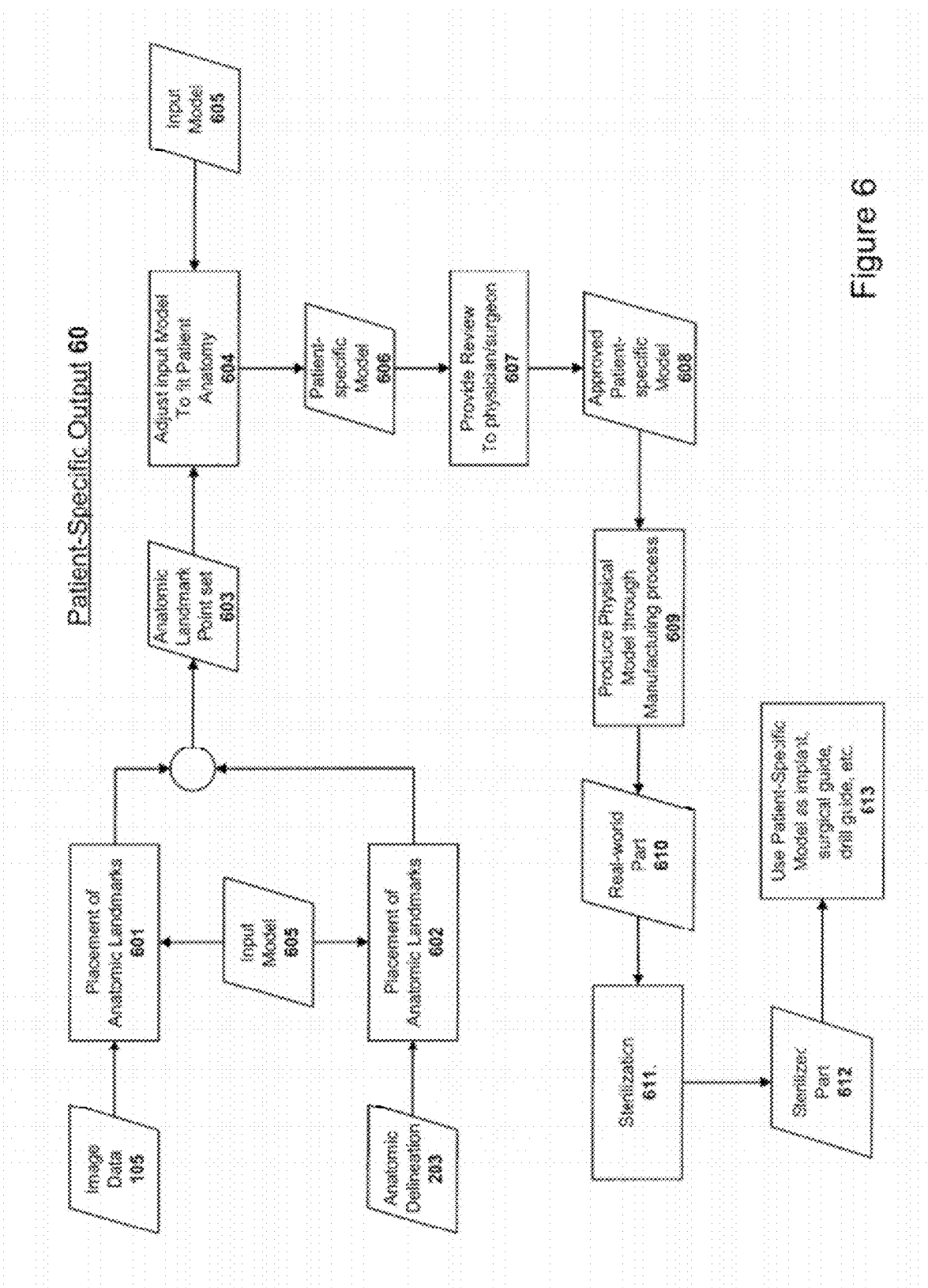
FIG. 6 depicts the creation of patient-specific output according to certain aspects of the invention.

FIG. 6 illustrates a process according to certain aspects of the invention that constructs patient specific parts 60. Patient image data 105 and/or an anatomic delineation 203 have landmarks placed either manually or automatically placed on them at 601 and 602. The resulting landmarks 603 may be influenced by input model 605, which describes a generic drill guide, surgical reference guide, surgical implant, etc. Input model 605 can be produced in any of a proprietary, commercial or standards based format including, for example, in a format comprehensible to a computer aided design (CAD) system or device that can interpret CAD models. Input model 605 may then be adjusted, warped, modified, scaled, etc. at 604 in response to landmark points 603. Adjustment 604 can result in a patient-specific model 606. A patient-specific model 606 may be provided to a requesting surgeon/ physician 607 for review and approval; typically, approval is obtained before proceeding with the workflow. If the model is not approved, processing either terminates or returns to one of the previous steps. In one example, a new start is made using new or different landmark and/or anatomical information.

Once approved, the patient-specific model 608 is used to drive a medical manufacturing process 609 that creates a part 610 from the model 608. The part 610 may be produced using computer controlled machining, extrusion, molding and other equipment. Model 608 is typically translated into a control language by a control process or prior to presentation to the control processor. For example, the equipment may be numerically controlled using industry standard control languages and the model may be processed to generate sequences of actions taken by individual manufacturing devices, whereby the sequences of actions are stored or transmitted in a text or binary form as appropriate for the equipment. The part 610 may be further processed manually. For example, the part will typically be inspected and may be ground, sanded, sealed or otherwise finished by hand, if necessary. Part 610 can then be sterilized and packaged at 611 to obtain a final product 612 ready for use by the requesting physician/surgeon 613.

Figure 7:
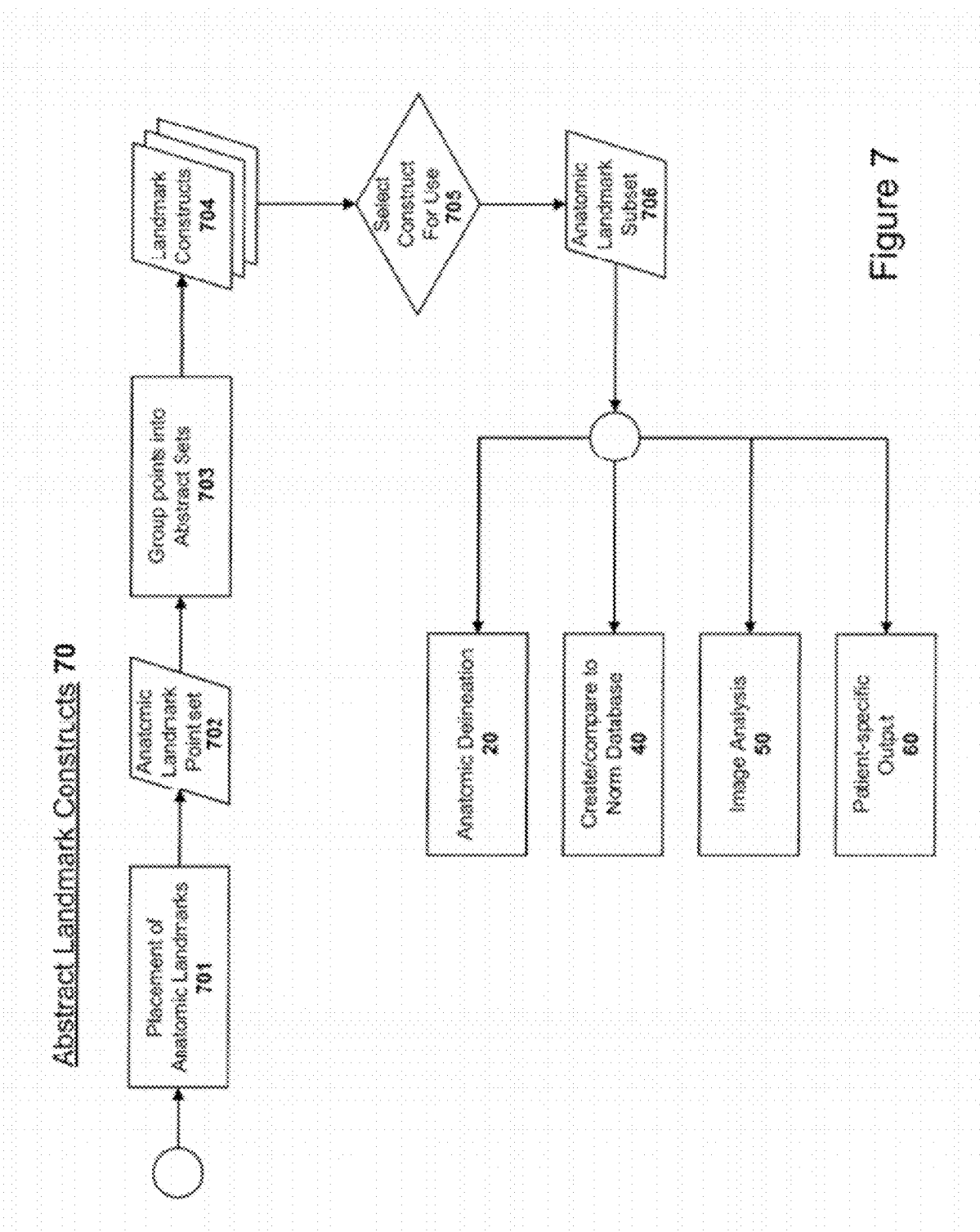
FIG. 7 is a flowchart describing a process associated with abstract landmark constructs according to certain aspects of the invention.

FIG. 7 depicts a process according to certain aspects of the invention that can be used for treating a set of landmark points as abstract constructs. Anatomical landmarks are placed 701 on image data, an anatomical surface, or some other data to obtain a set of landmark points 702. Abstract meaning is applied 703 to groups of points. In some embodiments this grouping can represent an anatomical construct, feature, or mathematical meaning, for example, an anatomical axis, plane, volume, part, or region, including, for example, a mechanical axis, axis of rotation, globe, femoral head (hip ball), and so on. The grouping 703 typically produces a plurality of anatomical constructs that can selected at 705, thereby producing a single point set 706 that can be processed further by subsequent analysis. Specification of anatomical constructs in this manner allows the abstract application of analytical methods to a subset of points defining a region of interest. These constructs can be specified either by the software vendor, a plug-in architecture, or at runtime by an operator.

Anatomical Landmarks

According to certain aspects of the invention, the placement of anatomical landmarks can be achieved by placing points onto 2D slices, including axial, coronal, and/or sagittal slices, and/or onto a 3D image derived from image data representative of a patient including, for example, a bone surface extracted from the image data. Typically, an operator can move points freely in three dimensions and is not restricted to having all landmark points on a single 2D slice through the image data. In one example, landmark points are placed in the following regions:

i) orbit rim superior and inferior;
   ii) orbit rim zygomatic and nasal;
   iii) where the optic nerve exits the orbit;
   iv) the external auditory canal; and
   v) globe center.

From these landmark points, useful quantitative information can be determined. For example, the Frankfurt plane, which is a common orientation frame-of-reference for crania, can also be used to derive measurements to points of interest within a head. These measurements can be expressed in the form of being projected to, by measuring distances to, or relative angles to this plane. The sagittal plane may be similarly employed for deriving measurements.

In certain embodiments, measurements between certain points of interest can be used to extrapolate information that can be used to perform higher level tasks, such as risk assessment for developing enopthalmos.

Missing/Displaced Anatomical Landmarks

Certain embodiments of the invention mirror non-injured, or otherwise normal, anatomical landmarks across the sagittal plane as a guide for missing anatomical landmarks. Anatomical landmarks may be completely missing or unusable because they are located on bone fracture that has been dislodged and are consequently displaced and/or distorted. Mirrored landmarks may be substituted for missing landmarks by direct copy and/or using one or more processes, such as statistical approximation methods, in order to determine a reasonable estimate to the normal location relative to the remaining measurable and usable anatomical landmarks.

Volume Computation

Computation of orbit volume can be determined by any number of image processing techniques, including region growing. Such processing typically begins within the orbit itself, usually where the optic nerve enters the globe because this entry point is typically located at a central point within the orbit. In certain embodiments, the selected technique can be guided using obtained anatomical landmarks and an image processing technique may be employed to determine the boundary of the bony orbit. Image processing may include examining image density values such as scalar value, gradient, etc. Where CT image data is available and/or used, air can be characterized by a low scalar value, tissue by a medium value and bone by a high value. In certain embodiments, the orbit image data is examined to determine the bounds of the bony orbit. It will be appreciated that such determination may be difficult to obtain because, generally, the orbit itself is not fully surrounded by bone and is not be expected to be so surrounded after injury. Accordingly, certain embodiments extrapolate orbit shape in areas where bone does not exist and/or cannot be used. In one example, a process of anatomical delineation 20 as shown in FIG. 2 can be employed.

Figure 8:
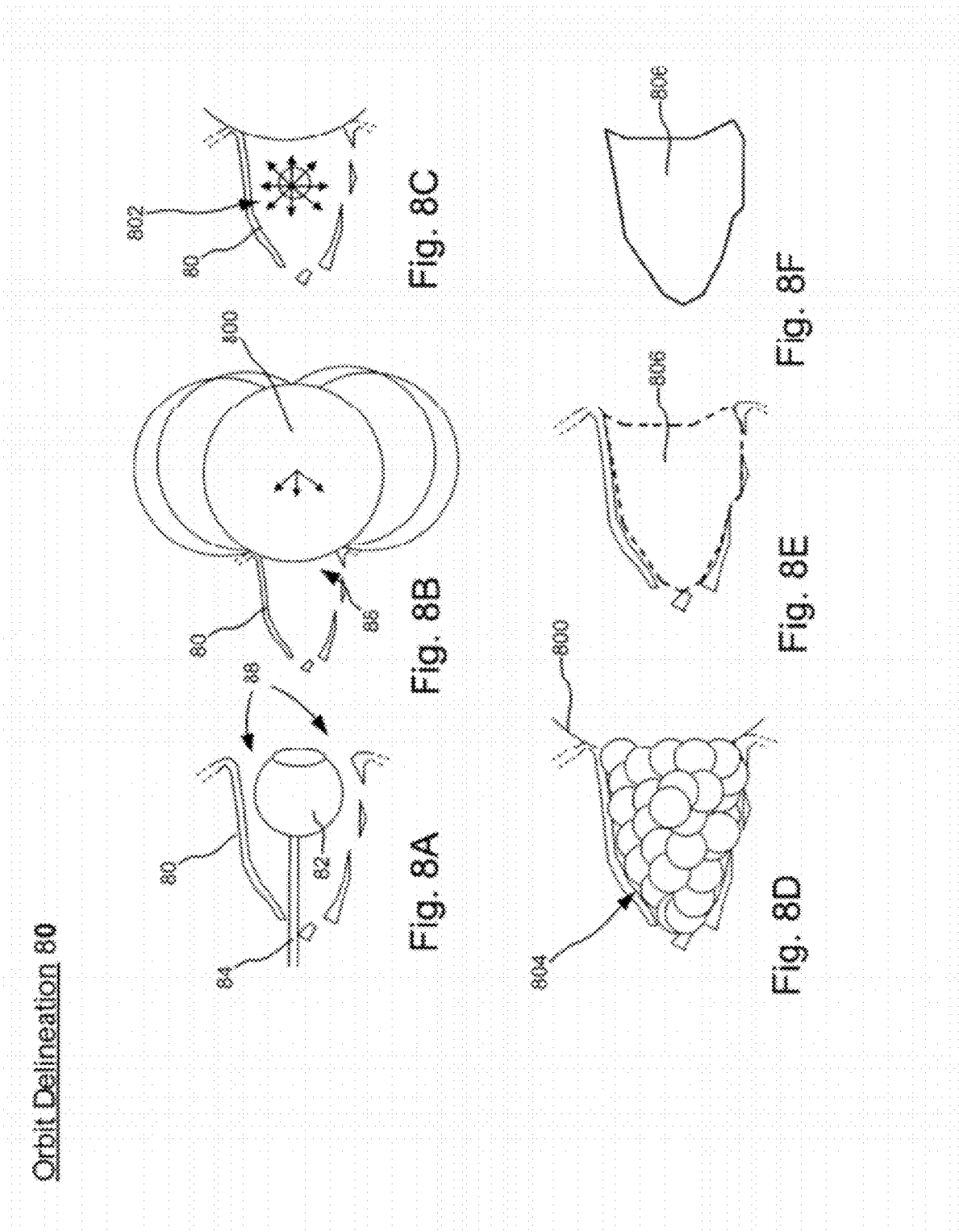
FIG. 8 shows the effect of certain processes used in embodiments of the present invention.

With reference also to FIG. 2, FIGS. 8A-8F depicts an example of orbit delineation process on a CT scan and illustrates certain steps related to the anatomical delineation process 21 applied to orbit segmentation. The orbit is shown in FIG. 8A with a bony outline 80, globe 82, and optic nerve 84. FIG. 8B depicts the effect of using a modified anatomical delineation process 20 that is run using a softball-sized template tool 800, 204. Process 21 is stopped at 208 and the covered image pixels 800, 208 are used to mask the anterior opening 88 of the orbit. In FIG. 8C, a second modified version of process 20 can be used within the orbit interior using a marble-sized template tool 802, 204. FIG. 8C depicts the coverage of the roaming marble-sized template tool 802, 204, which is prevented from exiting through the anterior opening 88 by the anterior mask 804 (partially shown) generated as shown in FIG. 8B. Upon completion of orbit interior roaming, the pixels 800 covered by the anterior roaming process of FIG. 8B are subtracted from the accumulated results to produce the bony orbit delineation 806, shown in FIG. 8E with reference to the orbit 80 and shown in FIG. 8F in isolation.

Globe Position

In certain embodiments, globe position can be computed through an examination of anatomical landmarks as discussed above. Distances may be computed between various of these points. The points may additionally be projected onto one or more anatomically relevant planes, including the Frankfurt and sagittal planes. The Frankfurt plane may be defined as the plane passing through points placed at the top of the left and right ear canals and the most inferior points on the left and right orbital rims. In certain embodiments, the plane can be obtained from any three of those points or approximated for all four.

In certain embodiments, consistency with conventional systems and methods may be attained by processing, arranging or otherwise providing results in a form consistent with results obtained by the Hertel exopthalmometer. For example, certain embodiments can determine the line between the anatomical landmarks placed on the outer left and right zygomatic orbit rims and then project this line and corneal landmark points onto the Frankfurt plane. The perpendicular distances, from the project corneal points to the projected line, provide the result.

Since the above-described method involves projecting onto a 2D plane, it is possible that some information is lost during projection. To improve the accuracy of this sort of measurement, certain embodiments compute the distance from the center of the globe to the Frankfurt and Sagittal planes. In addition, a frontal plane can be determined and the distance of the globe centers to the frontal plane can be computed. These distances can be used to compare an injured globe to a normal globe. In addition, these measurements can be monitored over time to compute a globe trajectory in order to determine if the globe position is changing.

Patient Specific Implant Construction

In order to compute orbit volume, certain embodiments compute the orbit shape represented as a surface from which the volume can be computed. This shape surface can be used to construct patient specific implants and prosthetics. These could be orbit floor implants or even globe prosthetics in the case when a globe is replaced.

Use of Results

Results provided by certain embodiments of the invention may be used to guide image processing techniques in order to better delineate the orbit region. For example, anatomical landmarks may be used to denote boundaries observed by an image processing technique.

Results provided by certain embodiments of the invention may be used to perform risk assessment for developing certain diseases or ailments. For example, a risk assessment for developing enopthalmos may be performed by examining the manner in which globe location changes over time—relative to the Frankfurt plane, for example.

Results obtained by certain embodiments of the invention may be used to compare morphometric information obtained from both orbits to determine variation between both eye orbits. This information can be used to determine the severity of an injury or disease by comparing an injured orbit to a healthy one. Orbit morphology can furthermore be compared to a population database to determine variation from population norms, which can be influential in determining risk and severity.

The resulting surface shape/contour obtained by certain embodiments of the invention can be used to fabricate patient specific implants. The resulting surface defines the complex inner region of the bony orbit and can be used to plan implant procedures, implant/prosthetic design, and fabrication procedures.

The results obtained by certain embodiments of the invention can be used to extrapolate reasonable positions for anatomical landmarks and/or bone positions in instances where they are dislodged, missing, fractured, or otherwise different from normal. This can be accomplished in a number of ways: for example, geometric morphometric techniques can be integrated and certain points of interest may be mirrored across planes of symmetry. These resulting locations can furthermore be used by a surgeon to plan surgical procedures or to provide recommendations.

The results obtained by certain embodiments of the invention can be gathered to establish population norms for certain morphological measurements. Results obtained from applications of certain embodiments of the invention to several individuals can be compiled to form this database. The aggregate of these results can be used to compare individuals to a population in order to establish population deviation, which can be used to characterize risk assessment and severity.

The results obtained by certain embodiments of the invention can be used to plan surgeries in or around the sinus region. The surgeon can thus make informed surgical planning processes, based on the results, which provide better surgical outcomes. Results can be provided to a surgeon in the form of a report (either in paper form, electronic form, or displayed on a computer screen) that describes relevant morphometric measurements and also provides visualizations of patient anatomy. Based on these results, the surgeon can perform patient treatment planning, surgical planning, diagnoses, and risk assessment.

Templates

In certain embodiments, templates are constructed with a shape that accounts for the geometry of an anatomical region to be analyzed. It will be appreciated that image data can comprise pixel information and/or voxel information according to the capabilities of the scanning system used: certain scanners can deliver 3D renditions of a volume while others may provide 2D images that can include a 2D slice and/or a 3D projection onto 2D space. For example, a template that may be serviceable in one 2D plane may appear distorted in a 2D image plane. Therefore, templates may be provided in various shapes and can have complex shapes. In 2D space, fore example, templates may be shaped as circles, ellipses, squares, triangles, etc., and may be adjusted to account for the effects of projection. Additionally, the shape may be complex to maximize efficiency of roaming, particularly within tight, angular and/or irregular areas.

As described above, templates are deployed within an area to identify anatomic boundaries of the area using a process that includes obtaining a plurality of image data, including pixels and/or voxels, which can be found as contiguous or non-contiguous neighbors. The template can be initially positioned at a location inside, outside, or intersecting an anatomic boundary of interest and may be guided by anatomical landmarks placed either by a user or automatically determined by some other process. Accordingly, the anatomic region can be delineated from within, from without and/or by following a boundary. Typically, image data within the template is analyzed after each placement of the template in order to determine properties, characteristics, and/or statistics representing the data profile of pixels/voxels contained within the template. Image data so analyzed may be marked, assigned and/or stored for later use and reference. Such image data and related information may be stored statically in a file or hard-coded into software. Image data may also be analyzed dynamically by any process or algorithm on an "as-needed" basis; for example, an algorithm may be configured to review and analyze information for each pass or execution of an algorithm.

As described above, the template is typically moved iteratively among available locations for the purpose of examining the image data at those locations. Locations may be neighboring positions, however, movement to a non-neighboring location is contemplated to improve efficiency of analysis and/or where no remaining neighbors exist (e.g. where template is in a corner).

In certain embodiments, data profiles are obtained at each template location, wherein the templates characterize image data comprising pixels and/or voxels within the template. Data profiles may be compared and contrasted during determination as to whether the new template location is inside, outside or intersecting the anatomic boundary of interest. Comparison of data profiles may also allow determination of whether a location has been masked by some other process. When the template is to be moved, the outcome of data profile comparison may contribute to selection of a next location for the template.

In certain embodiments, information may be assigned to image data (pixel/voxel) within the template, particularly after relocation of the template. The assigned information may include information that indicates template coverage, traversal history and other information pertaining to process or algorithm state.

Template based analysis may be terminated when all pixels/voxels have been traversed, when no un-traversed locations remain that meet anatomical constraints and/or when the process is cancelled by an external command, typically issued by an operator. In certain embodiments, pixels/voxels covered by the roaming-template process are identified and/or stored as a set of pixels/voxels that represent the region covered by the roaming-template process. Image data associated with pixels and/or voxels identified as covered by the roaming template can be used to create a mask or otherwise guide a subsequent application of the roaming-template process. For example, a second template may be used by a subsequent or parallel process.

Boundaries

In certain embodiments, covered pixel/voxel information can be used to identify the anatomic boundary. For example, a polyline/surface delineation may be obtained which encompasses the pixels/voxels covered by the roaming-template process and which represents the anatomic boundary interface.

As described above, landmark points can be placed onto image data, polylines, and/or anatomical surfaces delineations. These landmark points may be placed on anatomic boundaries determined from the covered pixel and/or voxel information. A set of points describing the anatomical shape of a space of interest can then be determined using the landmark points and covered image data. Analysis of landmark points obtained can include analysis of image pixel/voxel intensity information contained within the anatomic delineation. To this end, the analysis may provide morphological and/or shape properties, characteristics database, norm baseline, pixel/voxel data profiles and/or descriptive knowledge of shape information. Furthermore, information pertaining to abnormal variations thereof may also be obtained. Morphological and shape properties may be compared to the landmark points in order to obtain a surgical indication, diagnosis, severity prediction and/or a knowledge-based decision. Furthermore, information such as analysis-derived morphological and shape properties can typically be used to suggest landmark locations for points that may be missing, damaged, located on malformed anatomy, or otherwise unusable.

Having obtained shape, landmark and other information, the above-described patient-specific model (drill guide, surgical tool, implant, etc.) can be constructed. In certain instances, the model may be derived by placing an adjusted, corrected and/or supplemented set of landmark points directly on patient image data. A warped, scaled, or otherwise modified version of an input model that aligns certain aspects of the patient model to anatomically relevant features, points, planes, or surfaces may be used in model creation. In some embodiments, a new model can be directly created from patient image data and an analysis of shape information, landmark points, etc. A standard model can be customized of a standard model that can include one or more of a drill guide, a surgical tool and an implant, etc. in order to generate a patient-specific form based on information derived from analysis of the image data and/or from placing landmark points directly on patient image data. The customization of the standard model can take the form of, for example, cutting guidelines, device settings, etc., that adjust certain aspects of the patient-specific model/device based on anatomically relevant features, points, planes, or surfaces. In certain embodiments, landmark points may be identified, abstracted and processed as subsets of relevant or useful anatomical landmark points.

System Descriptions

Figure 9:
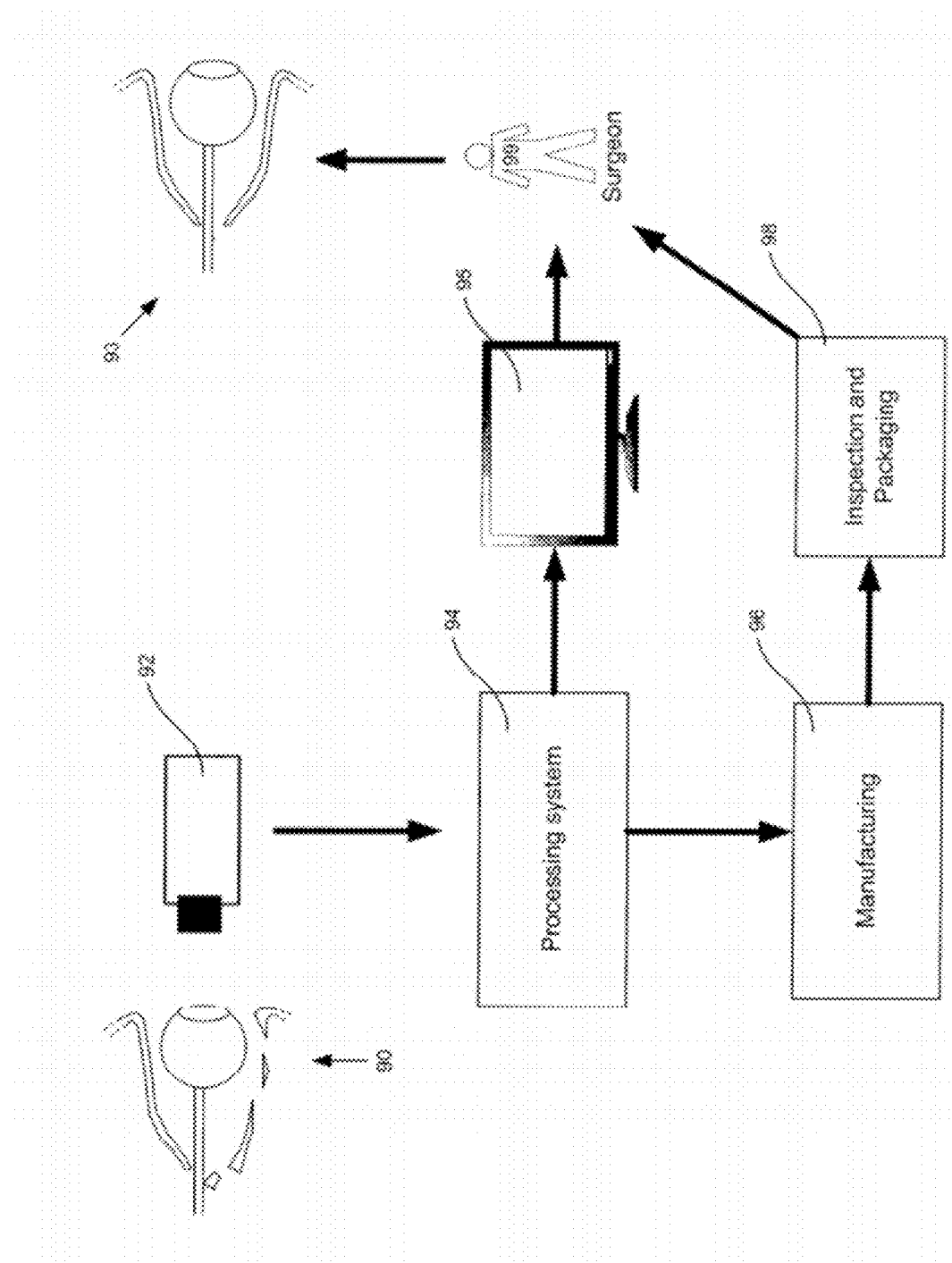
FIG. 9 is a block diagram showing a system incorporating certain aspects of the present invention.

In certain embodiments, the methods and processes are performed in the context of a system that supports medical procedures to repair damage to bone and other tissue. The block diagram of FIG. 9 illustrates the relationship of the various elements of such a system. An imaging subsystem 92 may be controlled by processing subsystem 94 to capture image data corresponding to damaged bone. Imaging subsystem 92 may include cameras, X-ray equipment, MRI, CT, PET, OCT, ultrasonic and other scanners.

In the example depicted, the damaged bone is found in the lower part of the orbit 90. As described above, the image data can be processed to define the structure and damage of the orbit and to model used in repair of the damage; for example, an implant may be required that replaces damaged bone or promotes regrowth of the damaged bone. Processing subsystem 94 may comprise image preprocessors that are configured to perform a variety of operations on image data to extract useful information and discard noise. Such preprocessors may be implemented in preconfigured embedded systems based on digital signal processors, for example. Processing system 94 may include a user display element that provides output to one or more display systems 95. User display element typically allows manipulation of a displayable image by a user. The user may be a surgeon 99, a graphics operator who monitors and controls modeling processes, a machine tool operator and/or a finisher who inspects and finalizes manufacture of an implant or other device.

Processing subsystem 94 typically generates images for diagnosis and planning of medical procedures, a model that can be converted for use in manufacturing an element designed to repair damage to orbit 90 and images of damage and models to a surgical system to assist in preparing the orbit 90 for repair, placement of an implant and verification of the medical procedure. Processing subsystem 94 may receive feedback from users, manufacturing subsystem 96 and surgical subsystem that can be used to refine a model and produce a final implant.

In certain embodiments, manufacturing subsystem 96 receives models and instructions from processing subsystem 94 and produces a product, typically an implant, for repairing damage to orbit 90. It will be appreciated that manufacturing subsystem 95 may operate in fully automatic mode, but often may include steps performed by one or more operators or artisans. Likewise, Inspection and final processing subsystem 98 may be fully automatic but typically includes a manual inspection and finishing step, as well as a sterilization process prior to packaging a device for delivery to a surgeon 99. Automatic inspection can be performed using imaging techniques and comparison of models with captured images. Surgeon 99 receives an implant part and may use model information, images received from imaging subsystem 92 and other data to effect repair of the orbit as depicted in element 93.

Figure 10:
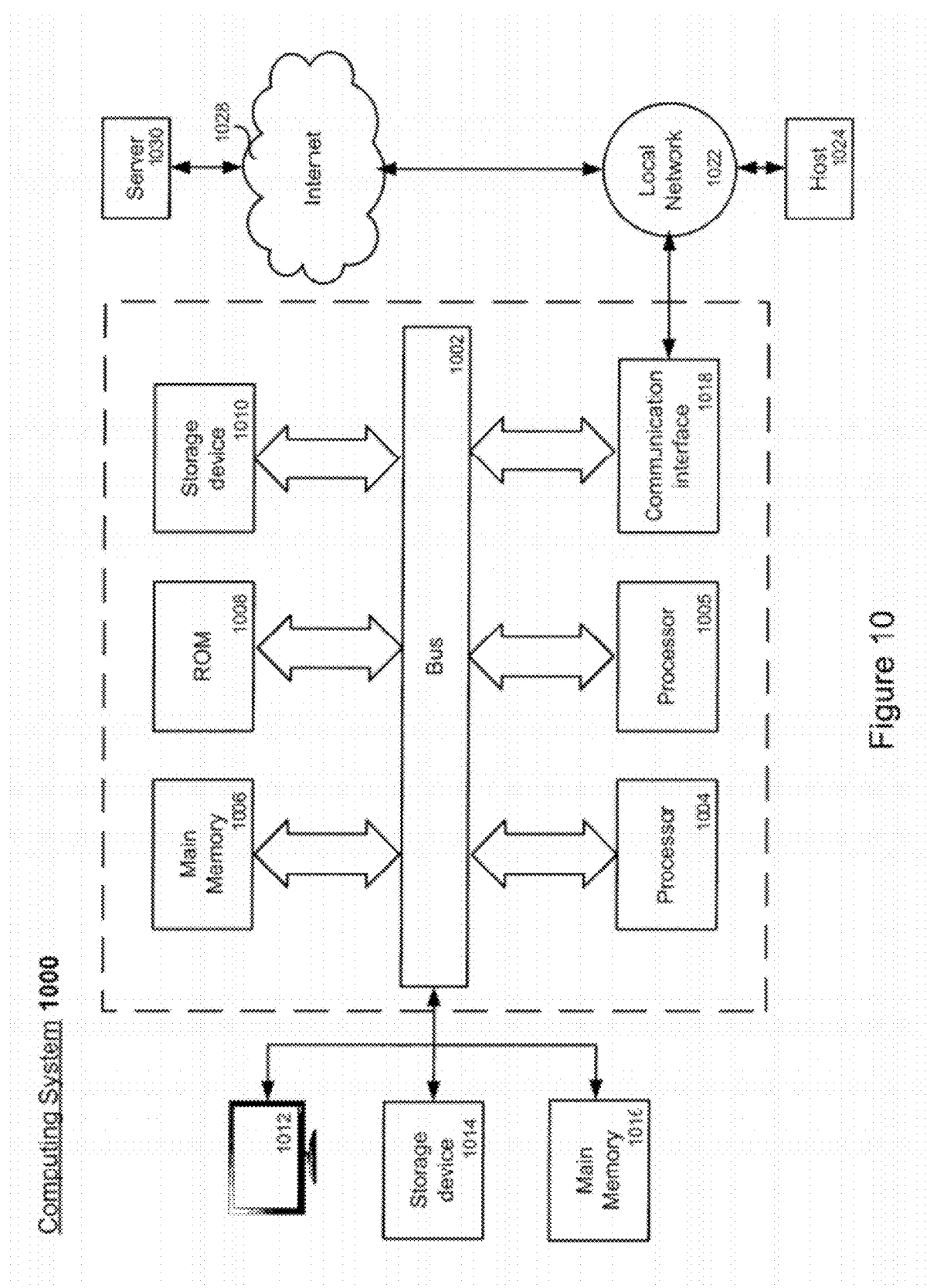
FIG. 10 is a block diagram describing a computing system employed in certain embodiments of the invention.

Turning now to FIG. 10, certain embodiments of the invention employ a processing system that includes at least one computing system 1000 deployed to perform certain of the steps described above. Computing systems may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, a manufacturing/machining system, a graphics processing workstation and/or a surgical system or other medical management system. In one example, computing system 1000 comprises a bus 1002 and/or other mechanisms for communicating between processors, whether those processors are integral to the computing system 100 (e.g. 1004, 1005) or located in different, perhaps physically separated computing systems 1000.

Computing system 1000 also typically comprises memory 1006 that may include one or more of random access memory ("RAM"), static memory, cache, flash memory and any other suitable type of storage device that can be coupled to bus 1002. Memory 1006 can be used for storing instructions and data that can cause one or more of processors 1004 and 1005 to perform a desired process. Main memory 1006 may be used for storing transient and/or temporary data such as variables and intermediate information generated and/or used during execution of the instructions by processor 1004 or 1005. Computing system 1000 also typically comprises non-volatile storage such as read only memory ("ROM") 1008, flash memory, memory cards or the like; non-volatile storage may be connected to the bus 1002, but may equally be connected using a high-speed universal serial bus (USB), Firewire or other such bus that is coupled to bus 1002. Non-volatile storage can be used for storing configuration, and other information, including instructions executed by processors 1004 and/or 1005. Non-volatile storage may also include mass storage device 1010, such as a magnetic disk, optical disk, flash disk that may be directly or indirectly coupled to bus 1002 and used for storing instructions to be executed by processors 1004 and/or 1005, as well as other information.

Computing system 1000 may provide an output for a display system 1012, such as an LCD flat panel display, including touch panel displays, electroluminescent display, plasma display, cathode ray tube or other display device that can be configured and adapted to receive and display information to a user of computing system 1000. In that regard, display 1012 may be provided as a remote terminal or in a session on a different computing system 1000. For example, a surgical system used in a sterile operating theater may receive images from a graphics processor that processes image data under control of a surgeon, other medical practitioner or other user. An input device 1014 is generally provided locally or through a remote system and typically provides for alphanumeric input as well as cursor control 1016 input, such as a mouse, a trackball, etc. It will be appreciated that input and output can be provided to a wireless device such as a PDA, a tablet computer or other system suitable equipped to display the images and provide user input.

According to one embodiment of the invention, portions of the imaging system, for example, identifying landmarks, may be performed by computing system 1000. Processor 1004 executes one or more sequences of instructions. For example, such instructions may be stored in main memory 1006, having been received from a computer-readable medium such as storage device 1010. Execution of the sequences of instructions contained in main memory 1006 causes processor 1004 to perform process steps according to certain aspects of the invention. In certain embodiments, functionality may be provided by embedded computing systems that perform specific functions wherein the embedded systems employ a customized combination of hardware and software to perform a set of predefined tasks. One example is a numerically controlled machine that controls a cutting edge used to fashion a material according to a model provided by computing system 1000. Thus, embodiments of the invention are not limited to any specific combination of hardware circuitry and software.

The term "computer-readable medium" is used to define any medium that can store and provide instructions and other data to processor 1004 and/or 1005, particularly where the instructions are to be executed by processor 1004 and/or 1005 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 1004 and 1005 or remotely, typically by use of network connection. Non-volatile storage may be removable from computing system 1004, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 1000. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 1004 and/or 1005. For example, the instructions may initially be retrieved from a magnetic disk of a remote computer and transmitted over a network or modem to computing system 1000. The instructions may optionally be stored in a different storage or a different part of storage prior to or during execution.

Computing system 1000 may include a communication interface 1018 that provides two-way data communication over a network 1020 that can include a local network 1022, a wide area network or some combination of the two. For example, an integrated services digital network (ISDN) may used in combination with a local area network (LAN). In another example, a LAN may include a wireless link. Network link 1020 typically provides data communication through one or more networks to other data devices. For example, network link 1020 may provide a connection through local network 1022 to a host computer 1024 or to a wide are network such as the Internet 1028. Local network 1022 and Internet 1028 may both use electrical, electromagnetic or optical signals that carry digital data streams. T Computing system 1000 can use one or more networks to send messages and data, including program code and other information. In the Internet example, a server 1030 might transmit a requested code for an application program through Internet 1028 and may receive in response a downloaded application that provides for the anatomical delineation described in the examples above. The received code may be executed by processor 1004 and/or 1005.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for computing morphological attributes of craniofacial anatomy including orbit volume and globe position. Some of these embodiments comprise obtaining accurate and reproducible morphological measurements from image data. In some of these embodiments, the image data is obtained from CT and MRI images. In some of these embodiments, the image data are obtained from 3 dimensional scans of a patient. Some of these embodiments further comprise marking 3D anatomical landmarks within the image data. Some of these embodiments further comprise automatically computing an orbit volume. Some of these embodiments further comprise computing a globe position. Some of these embodiments further comprise computing morphological measurements derived from the anatomical landmarks.

In some of these embodiments, marking anatomical landmarks includes placing markers onto 2D slices of an image of a patient. In some of these embodiments, the slices are axial slices. In some of these embodiments, the slices are coronal slices. In some of these embodiments, the slices are sagittal slices. In some of these embodiments, marking anatomical landmarks includes placing markers onto a 3D representation of the patient. In some of these embodiments, the representation includes a bone surface image extracted from the image data. In some of these embodiments, markers can be relocated in three dimensions. In some of these embodiments, markers are placed in relation to one or more locations including an orbit rim superior, an orbit rim inferior, an orbit rim zygomatic, an orbit rim nasal, at an exit point of the optic nerve from the orbit, above the ear canal, at globe center, at an entry point of the optic nerve to the globe and on the cornea.

Some of these embodiments further comprise quantifying information associated with the landmark points. In some of these embodiments, quantifying includes determining the Frankfurt plane or sagittal plane as an orientation frame-of-reference for crania. Some of these embodiments further comprise deriving measurements to points of interest within a head from the determined plane. In some of these embodiments, the points of interest are provided as projections. In some of these embodiments, the projections are obtained by measuring distances to the plane. In some of these embodiments, the projections are determined using relative angles to this plane. Some of these embodiments further comprise extrapolating measurements between certain points of interest. In some of these embodiments, the extrapolated measurements are used for assessing a risk of developing enopthalmos.

Some of these embodiments further comprise mirroring selected landmarks to compensate for displaced anatomical landmarks. In some of these embodiments, mirroring includes translating the selected landmarks through sagittal plane. In some of these embodiments, translating includes using statistical approximation to determine a reasonable estimate of the original location of the displaced landmarks. In some of these embodiments, the displaced landmarks include missing landmarks.

In some of these embodiments, orbit volume is determined by one or more image processing techniques. In some of these embodiments, the image processing techniques include region growing. In some of these embodiments, the image processing technique extrapolates orbit shape in areas where bone does not exist. In some of these embodiments, the image processing technique extrapolates orbit shape in areas where bone is unusable.

Some of these embodiments further comprise creating a hierarchy of 3D representations having decreasing resolution. Some of these embodiments further comprise examining a plurality of 3D representations having different resolutions and smoothing features in the image data based on the examining. In some of these embodiments, computing globe position includes examining the markers. In some of these embodiments, examining the markers includes calculating distances between the markers and projecting points onto anatomically relevant planes. Some of these embodiments further comprise mapping the sinus region. In some of these embodiments, the mapping includes obtaining morphological measurements from the mapping.

Certain embodiments of the invention provide systems and methods that comprise an imager that provides image data characteristic of a defect in a body part, a processor that delineates an anatomic region in the image data and a modeler that generates an anatomic model of a portion of the body part associated with the defect. In some of these embodiments, the anatomical model is derived from the delineated anatomic region. In some of these embodiments, the anatomic model is used to prepare a part for repairing the defect. In some of these embodiments, the processor uses a roaming template to delineate the anatomic region. In some of these embodiments, the template is used to identify a plurality of pixels that are located within the anatomic region. In some of these embodiments, the processor delineates the anatomic region by isosurface extraction. In some of these embodiments, the processor uses a roaming template to delineate the anatomic region. In some of these embodiments, the template is used to identify a plurality of voxels that are located within the anatomic region. In some of these embodiments, the processor delineates the anatomic region by isosurface extraction.

Some of these embodiments comprise an evaluator that generates a surgical indication based on variances between anatomical landmarks identified in the delineated anatomic region and predetermined norms. In some of these embodiments, the evaluator diagnoses the defect based on the variances. In some of these embodiments, the evaluator predicts severity of the defect based on the variances.

In some of these embodiments, the identified anatomical landmarks include at least one substituted anatomical landmark that substitutes for a corresponding at least one unusable anatomical landmark in the delineated anatomic region. In some of these embodiments, the anatomic model is generated by adjusting an input model based on the identified anatomical landmarks. In some of these embodiments, the anatomic model drives a device that manufactures a part used to repair the defect. In some of these embodiments, the input model comprises a model of a surgical implant and the part comprises a surgical implant. In some of these embodiments, the input model comprises a drill guide. In some of these embodiments, the input model comprises a surgical reference guide.

Some of these embodiments comprise a method having steps that include obtaining image data characterizing an anatomic region that includes a defect, delineating boundaries of the anatomic region using anatomic landmarks and a roaming template to identify covered image elements that lie within the anatomic region and generating a model of the anatomic region using the boundaries and the anatomic landmarks. In some of these embodiments, the model is used to produce a part for repairing the defect. In some of these embodiments, delineating the boundaries includes positioning the template at a location selected based on the anatomic landmarks. In some of these embodiments, delineating the boundaries includes determining if an intersection of the template with a boundary exists based on an examination of image elements located within the area of the template. In some of these embodiments, delineating the boundaries includes marking covered image elements lying within the anatomic region based on the intersection determining step. In some of these embodiments, delineating the boundaries includes relocating the template at an unvisited location prior to repeating the steps of determining, marking and relocating unless substantially all image elements within the anatomic region have been marked.

In some of these embodiments, the positioning step includes positioning the template at a location proximate to a center of the anatomic region. In some of these embodiments, delineating the boundaries further includes using isosurface extraction to obtain a delineated anatomic surface from the covered image elements. In some of these embodiments, delineating the boundaries further includes identifying covered image elements that lie within the anatomic region using one or more additional roaming templates. Some of these embodiments comprise identifying variations between patient information and predetermined norms. In some of these embodiments, the patient information includes the covered image elements and anatomical landmarks identified in the delineated anatomic region. In some of these embodiments, the anatomical landmarks include an anatomical landmark substituted for an unusable anatomical landmark in the anatomic region. In some of these embodiments, the model is based on an input model adjusted responsive to the anatomical landmarks and wherein the model is used to form an implantable part for repairing the defect.

Some of these embodiments comprise a computer-readable medium that stores instructions executable by one or more processing devices. In some of these embodiments, the instructions cause the processor to perform any of the steps recited above. In some of these embodiments, the instructions cause the processor to perform steps that include obtaining image data characterizing an anatomic region that includes a defect, identifying anatomic landmarks in the image data, delineating anatomic boundaries of the anatomic region using the anatomic landmarks and a roaming template to mark image elements within the anatomic region, generating a model of the anatomic region using the anatomic boundaries and the marked image elements and creating a specification of a part for repairing the defect using the model.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A system, comprising:
   an imager that provides image data characteristic of a body part that has a defect;
   a processor that delineates an anatomic region in the image data; and
   a modeler that generates an anatomic model of a portion of the body part associated with the defect, wherein the anatomical model is derived from the delineated anatomic region and wherein the anatomic model is used to prepare a part for repairing the defect.

2. The system of claim 1, wherein the processor uses a roaming template to delineate the anatomic region, wherein the template is used to identify a plurality of pixels that are located within the anatomic region and wherein the processor delineates the anatomic region by isosurface extraction.

3. The system of claim 1, wherein the processor uses a roaming template to delineate the anatomic region, wherein the template is used to identify a plurality of voxels that are located within the anatomic region, and wherein the processor delineates the anatomic region by isosurface extraction.

4. The system of claim 1, further comprising an evaluator that generates a surgical indication based on variances between predetermined norms and anatomical landmarks identified in the delineated anatomic region.

5. The system of claim 4, wherein the evaluator diagnoses the defect based on the variances.

6. The system of claim 4, wherein the evaluator predicts severity of the defect based on the variances.

7. The system of claim 4, wherein the identified anatomical landmarks include at least one substituted anatomical landmark that substitutes for a corresponding at least one unusable anatomical landmark in the delineated anatomic region.

8. The system of claim 7, wherein the anatomic model is generated by adjusting an input model based on the identified anatomical landmarks.

9. The system of claim 8, wherein the anatomic model drives a device that manufactures a part used to repair the defect.

10. The system of claim 9, wherein the input model comprises a model of a surgical implant and the part comprises a surgical implant.

11. The system of claim 8, wherein the input model comprises a drill guide.

12. The system of claim 9, wherein the input model comprises a surgical reference guide.

13. A method, comprising:
   obtaining image data characterizing an anatomic region that includes a defect;
   delineating boundaries of the anatomic region using anatomic landmarks and a roaming template to identify covered image elements that lie within the anatomic region; and
   generating a model of the anatomic region using the delineated boundaries and the anatomic landmarks, wherein the model is used to produce a part for repairing the defect.

14. The method of claim 13, wherein delineating the boundaries includes:
   positioning the template at a location selected based on the anatomic landmarks;
   determining if an intersection of the template with a boundary exists based on an examination of image elements located within the area of the template;

marking covered image elements lying within the anatomic region based on the intersection determining step; and relocating the template at an unvisited location prior to repeating the steps of determining, marking and relocating unless substantially all image elements within the anatomic region have been marked.

15. The method of claim 14, wherein the positioning step includes positioning the template at a location proximate to a center of the anatomic region.

16. The method of claim 14, wherein delineating the boundaries further includes using isosurface extraction to obtain a delineated anatomic surface from the covered image elements.

17. The method of claim 14, wherein delineating the boundaries further includes identifying covered image elements that lie within the anatomic region using one or more additional roaming templates.

18. The method of claim 14, further comprising identifying variations between patient information and predetermined norms, wherein the patient information includes the covered image elements and anatomical landmarks identified in the delineated anatomic region.

19. The method of claim 13, wherein the anatomical landmarks include an anatomical landmark substituted for an unusable anatomical landmark in the anatomic region.

20. The method of claim 19, wherein the model is based on an input model adjusted responsive to the anatomical landmarks and wherein the model is used to form an implantable part for repairing the defect.

21. A computer-readable medium that stores instructions executable by one or more processing devices, wherein the instructions cause the processor to perform the steps of:

obtaining image data characterizing an anatomic region that includes a defect;

identifying anatomic landmarks in the image data;

delineating anatomic boundaries of the anatomic region using the anatomic landmarks and a roaming template to mark image elements within the anatomic region;

generating a model of the anatomic region using the anatomic boundaries and the marked image elements; and creating a specification of a part for repairing the defect using the model.

* * * * *